US012681750B2

(12) United States Patent
Hemashekar et al.

(10) Patent No.: US 12,681,750 B2
(45) Date of Patent: Jul. 14, 2026

(54) SYSTEM AND METHOD FOR ANALYZING RESOURCE ELASTICITY PROFILES OF COMPUTING ENVIRONMENTS

(71) Applicant: VMware, Inc., Palo Alto, CA (US)

(72) Inventors: Bharath Siddapur Hemashekar, Santa Clara, CA (US); Vaishnavi Manjunath, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 497 days.

(21) Appl. No.: 18/378,258

(22) Filed: Oct. 10, 2023

(65) Prior Publication Data

US 2025/0117239 A1    Apr. 10, 2025

(51) Int. Cl.
*G06F 9/455*        (2018.01)
(52) U.S. Cl.
CPC .. *G06F 9/45558* (2013.01); *G06F 2009/4557* (2013.01); *G06F 2009/45579* (2013.01)
(58) Field of Classification Search
CPC ......... G06F 9/45558; G06F 2009/4557; G06F 2009/45579
See application file for complete search history.

(56) References Cited

U.S. PATENT DOCUMENTS

2019/0379576 A1* 12/2019 Narnakaje Venugopala ...............
                                          H04L 41/0631
2020/0004589 A1*  1/2020 Geiger ................ H04L 41/0894

OTHER PUBLICATIONS

Ovebeck, Dave, "Predictive DRS", https://blogs.vmware.com/management/author/doverbeek, Nov. 17, 2016, 5 pgs.
VMW, "How the Elastic DRS Algorithm Works", VMware Cloud on AWS Operations Guide, https://docs.vmware.com/en/VMware-Cloud-on-AWS/services/com.vmware.vmc-aws-operations/GUID-5332B1A8-56AA-49F4-A936-E624A90F3D89.html, , Sep. 20, 2023, 142 pgs.
VMW, "Manage Elasticity in SDDC Clusters", VMware Cloud on AWS Operations Guide, https://docs.vmware.com/en/VMware-Cloud-on-AWS/services/com.vmware.vmc-aws-operations/GUID-5332B1A8-56AA-49F4-A936-E624A90F3D89.html, Sep. 20, 2023, 142 pgs.
"Smoothing Splines", Advanced Methods for Data Analysis (36-402/36-608), Spring 2014, 4 pgs.

* cited by examiner

*Primary Examiner* — Wissam Rashid
(74) *Attorney, Agent, or Firm* — King Intellectual Asset Management

(57)        ABSTRACT

A system and computer-implemented method for analyzing software-defined data centers (SDDCs) uses resource utilization metrics for an SDDC to determine a plurality of scale-in and scale-out events in the SDDC for a period of time using a particular combination of resource scale-in and scale-out thresholds defined and to compute a total cost of the SDDC during the period of time based on a changing number of hosts being used in the SDDC due to the plurality of scale-in and scale-out events in the SDDC during the period of time. Parameters of a resource manager in the SDDC are set according to the particular combination of resource scale-in and scale-out thresholds in response to user input.

20 Claims, 7 Drawing Sheets

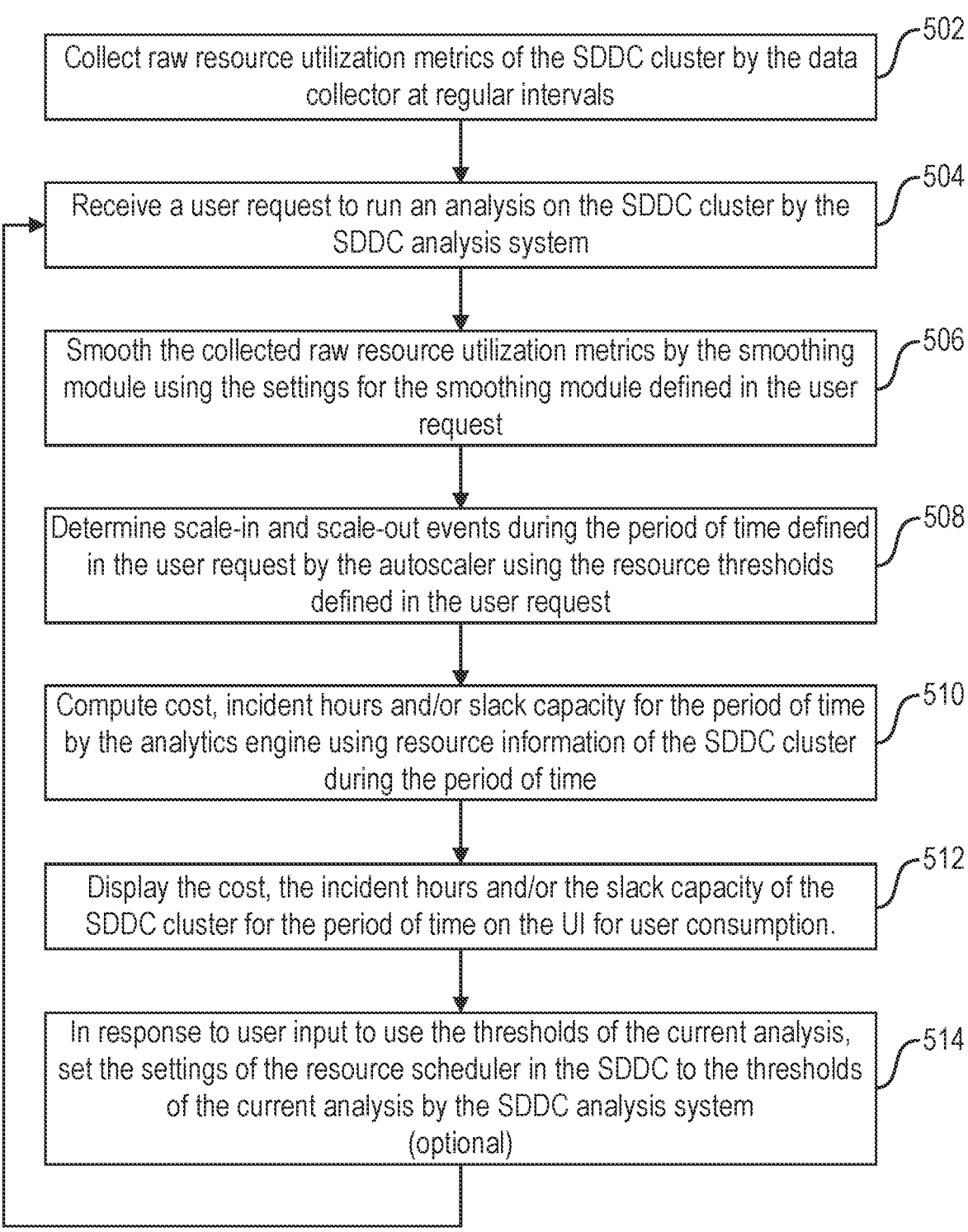

Collect raw resource utilization metrics of the SDDC cluster by the data collector at regular intervals — 502

Receive a user request to run an analysis on the SDDC cluster by the SDDC analysis system — 504

Smooth the collected raw resource utilization metrics by the smoothing module using the settings for the smoothing module defined in the user request — 506

Determine scale-in and scale-out events during the period of time defined in the user request by the autoscaler using the resource thresholds defined in the user request — 508

Compute cost, incident hours and/or slack capacity for the period of time by the analytics engine using resource information of the SDDC cluster during the period of time — 510

Display the cost, the incident hours and/or the slack capacity of the SDDC cluster for the period of time on the UI for user consumption. — 512

In response to user input to use the thresholds of the current analysis, set the settings of the resource scheduler in the SDDC to the thresholds of the current analysis by the SDDC analysis system (optional) — 514

FIG. 5

SYSTEM AND METHOD FOR ANALYZING RESOURCE ELASTICITY PROFILES OF COMPUTING ENVIRONMENTS

BACKGROUND

Software-defined data centers (SDDCs) may be deployed in any computing environment. These SDDCs may be deployed in an on-premises computing environment and/or in a public cloud environment. For a given SDDC, there may be many customizable resource policy parameters for resource management entities to ensure that workloads are properly running on the SDDC with sufficient resources, while costs associated with using the resources are minimized. These resource policy parameters may be related to resource balancing and resource elasticity operations using various customizable thresholds, which affect cost and performance of the SDDC in a complex manner. Thus, to properly set the resource policy parameters of an SDDC to strike a balance between cost and performance is a challenging task.

SUMMARY

A system and computer-implemented method for analyzing software-defined data centers (SDDCs) uses resource utilization metrics for an SDDC to determine a plurality of scale-in and scale-out events in the SDDC for a period of time using a particular combination of resource scale-in and scale-out thresholds defined and to compute a total cost of the SDDC during the period of time based on a changing number of hosts being used in the SDDC due to the plurality of scale-in and scale-out events in the SDDC during the period of time. Parameters of a resource manager in the SDDC are set according to the particular combination of resource scale-in and scale-out thresholds in response to user input.

A computer-implemented method for analyzing software-defined data centers (SDDCs) in accordance with an embodiment of the invention comprises periodically collecting resource utilization metrics for an SDDC being analyzed, in response to a first user input, determining a plurality of scale-in and scale-out events in the SDDC for a period of time using the resource utilization metrics and a particular combination of resource scale-in and scale-out thresholds defined in the first user input, in response to the first user input, computing a total cost of the SDDC during the period of time based on a changing number of hosts being used in the SDDC due to the plurality of scale-in and scale-out events in the SDDC during the period of time and a cost per host per unit time, and in response to a second user input, setting parameters of a resource manager in the SDDC according to the particular combination of resource scale-in and scale-out thresholds. In some embodiments, the steps of this method are performed when program instructions contained in a non-transitory computer-readable storage medium are executed by one or more processors.

A system in accordance with an embodiment of the invention comprises memory and at least one processor configured to periodically collect resource utilization metrics for a software-defined data center (SDDC) being analyzed, in response to a first user input, determine a plurality of scale-in and scale-out events in the SDDC for a period of time using the resource utilization metrics and a particular combination of resource scale-in and scale-out thresholds defined in the first user input, in response to the first user input, compute a total cost of the SDDC during the period of time based on a changing number of hosts being used in the SDDC due to the plurality of scale-in and scale-out events in the SDDC during the period of time and a cost per host per unit time, and in response to a second user input, set parameters of a resource manager in the SDDC according to the particular combination of resource scale-in and scale-out thresholds.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 5 is a process flow diagram of a process of analyzing an SDDC in the computing system by the SDDC analysis system in accordance with an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
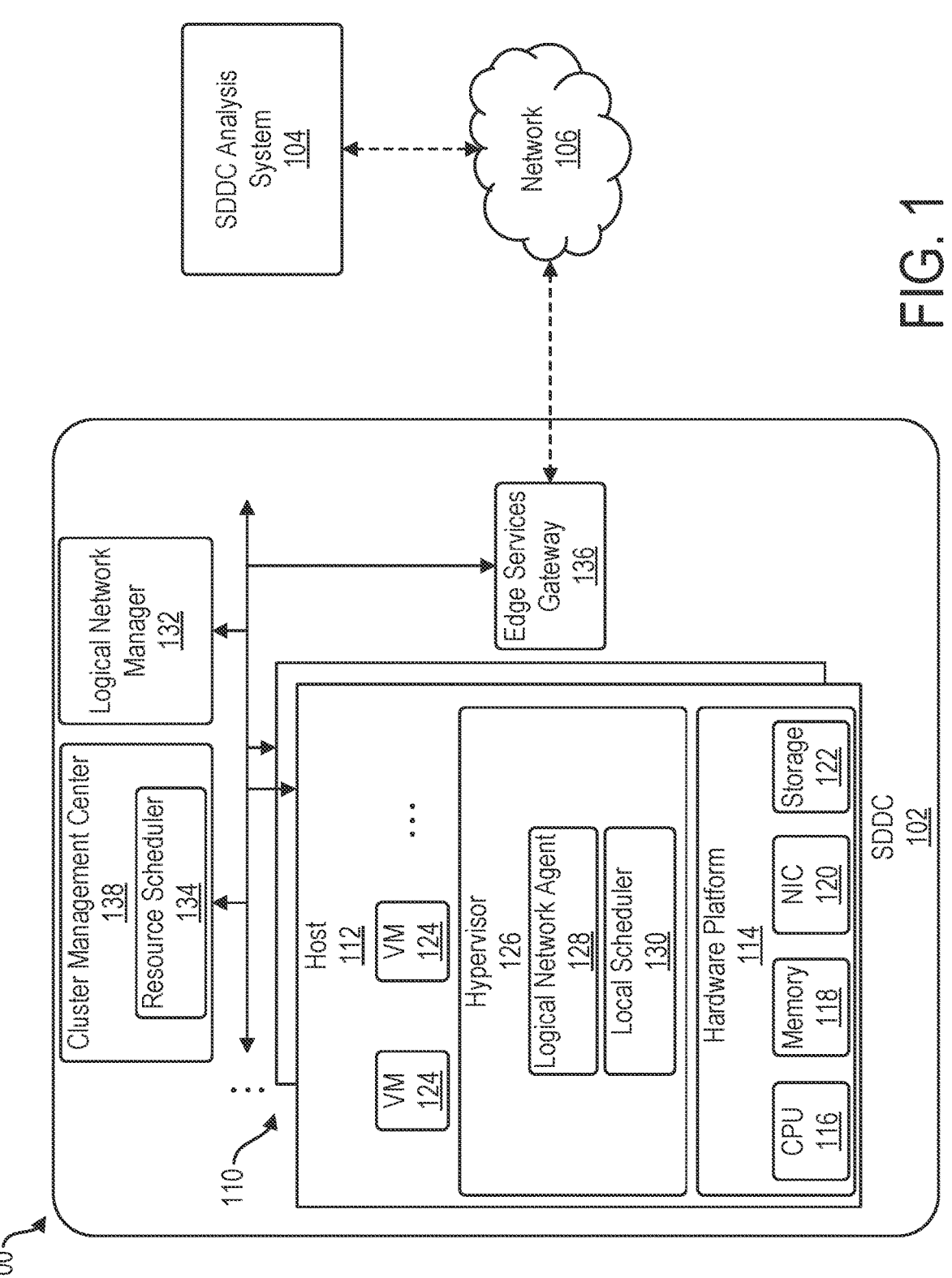
FIG. 1 is a block diagram of a computing system in accordance with an embodiment of the invention.

Turning now to FIG. 1, a computing system 100 in accordance with an embodiment of the invention is illustrated. The computing system 100 includes a computing environment in the form of a software-defined data center (SDDC) 102, which may be running in a private cloud environment, a public cloud environment or a hybrid (private and public) cloud environment. The SDDC 102 is connected to an SDDC analysis system 104 via a network 106 to provide resource utilization information of the SDDC. In other embodiments, the SDDC analysis system 104 may be directly connected to one or more components in the SDDC 102. As described in more below, the SDDC analysis system 104 analyzes the SDDC 102 to provide an intuitive visualization where SDDC users can efficiently and effectively characterize and tune their workloads and policy parameters.

As shown in FIG. 1, the SDDC 102 includes a cluster 110 of host computers ("hosts") 112, which is a logical grouping of hosts. The hosts 112 may be constructed on a server grade hardware platform 114, such as an x86 architecture platform. As shown, the hardware platform 114 of each host 112 may include conventional components of a computer, such as one or more processors (e.g., CPUs) 116, system memory 118, a network interface 120, and storage 122. The processor 116 can be any type of a processor commonly used in servers. The memory 118 is volatile memory used for retrieving programs and processing data. The memory 118 may include, for example, one or more random access memory (RAM) modules. The network interface 120 enables the host 112 to communicate with other devices that are inside or outside of the SDDC 102 via a communication network. The network interface 120 may be one or more network adapters, also referred to as network interface cards (NICs). The storage 122 represents one or more local storage devices (e.g., one or more hard disks, flash memory modules, solid state disks and/or optical disks), which may be part of a virtual storage (e.g., virtual storage area network (vSAN)).

Each host 112 may be configured to provide a virtualization layer that abstracts processor, memory, storage and networking resources of the hardware platform 114 into virtual computing instances (VCIs) 124 that run concurrently on the same host. As used herein, the term "virtual computing instance" refers to any software processing entity that can run on a computer system, such as a software application, a software process, a virtual machine or a virtual container. A virtual machine is an emulation of a physical computer system in the form of a software computer that, like a physical computer, can run an operating system and applications. A virtual machine may be comprised of a set of specification and configuration files and is backed by the physical resources of the physical host computer. A virtual machine may have virtual devices that provide the same functionality as physical hardware and have additional benefits in terms of portability, manageability, and security. An example of a virtual machine is the virtual machine created using VMware vSphere® solution made commercially available from VMware, Inc of Palo Alto, California. A virtual container is a package that relies on virtual isolation to deploy and run applications that access a shared operating system (OS) kernel. An example of a virtual container is the virtual container created using a Docker engine made available by Docker, Inc. In this disclosure, the virtual computing instances will be described as being virtual machines, although embodiments of the invention described herein are not limited to virtual machines (VMs).

In the illustrated embodiment, the VCIs in the form of VMs 124 are provided by host virtualization software 126, which is referred to herein as a hypervisor, that enables sharing of the hardware resources of the host by the VMs. One example of the hypervisor 126 that may be used in an embodiment described herein is a VMware ESXi™ hypervisor provided as part of the VMware vSphere® solution made commercially available from VMware, Inc. The hypervisor 126 may run on top of the operating system of the host or directly on hardware components of the host. For other types of VCIs, the host may include other virtualization software platforms to support those VCIs, such as Docker virtualization platform to support "containers". Although embodiments of the inventions may involve other types of VCIs, various embodiments of the invention are described herein as involving VMs.

In the illustrated embodiment, the hypervisor 126 includes a logical network (LN) agent 128, which operates to provide logical networking capabilities, also referred to as "software-defined networking". Each logical network may include software managed and implemented network services, such as bridging, L3 routing, L2 switching, network address translation (NAT), and firewall capabilities, to support one or more logical overlay networks in the SDDC 102. The logical network agent 128 may receive configuration information from a logical network manager 132 (which may include a control plane cluster) and, based on this information, populates forwarding, firewall and/or other action tables for dropping or directing packets between the VMs 124 in the host 112, other VMs on other hosts, and/or other devices outside of the SDDC 102. Collectively, the logical network agent 128, together with other logical network agents on other hosts, according to their forwarding/routing tables, implement isolated overlay networks that can connect arbitrarily selected VMs with each other. Each VM may be arbitrarily assigned a particular logical network in a manner that decouples the overlay network topology from the underlying physical network. Generally, this is achieved by encapsulating packets at a source host and decapsulating packets at a destination host so that VMs on the source and destination can communicate without regard to the underlying physical network topology. In a particular implementation, the logical network agent 128 may include a Virtual Extensible Local Area Network (VXLAN) Tunnel End Point or VTEP that operates to execute operations with respect to encapsulation and decapsulation of packets to support a VXLAN backed overlay network. In alternate implementations, VTEPs support other tunneling protocols, such as stateless transport tunneling (STT), Network Virtualization using Generic Routing Encapsulation (NVGRE), or Geneve, instead of, or in addition to, VXLAN.

The hypervisor 126 may also include a local scheduler 130. The local scheduler 130 operates as a part of a distributed resource management system, which is controlled by a resource scheduler 134, as described below. The distributed resource management system provides various resource management features for the SDDC 102, including placement of software components, e.g., the VMs 124, in the hosts 112 of the SDDC 102 using various placement rules.

As noted above, the SDDC 102 also includes the logical network manager 132 (which may include a control plane cluster), which operates with the logical network agents 128 in the hosts 112 to manage and control logical overlay networks in the SDDC. In some embodiments, the SDDC 102 may include multiple logical network managers that provide the logical overlay networks of the SDDC. Logical overlay networks comprise logical network devices and connections that are mapped to physical networking resources, e.g., switches and routers, in a manner analogous to the manner in which other physical resources as compute and storage are virtualized. In an embodiment, the logical network manager 132 has access to information regarding physical components and logical overlay network components in the SDDC 102. With the physical and logical overlay network information, the logical network manager 132 is able to map logical network configurations to the physical network components that convey, route, and filter physical traffic in the SDDC 102. In a particular implementation, the logical network manager 132 is a VMware NSX® Manager™ product running on any computer, such as one of the hosts 112 or VMs 124 in the SDDC 102.

The SDDC 102 also includes one or more edge services gateway 136 to control network traffic into and out of the SDDC. In a particular implementation, the edge services gateway 136 is VMware NSX® Edge™ product made available from VMware, Inc. running on any computer, such as one of the hosts 112 or VMs 124 in the SDDC 102. The logical network manager(s) 132 and the edge services gateway(s) 136 are part of a logical network platform, which supports the software-defined networking in the SDDC 102.

The SDDC 102 further includes a cluster management center 138, which operates to manage and monitor one or more clusters of hosts 112, such as the cluster 110. A cluster of hosts is a logical grouping of hosts, which share the compute, network and/or storage resources of the cluster. The cluster management center 138 may be configured to allow an administrator to selectively create clusters of hosts, add hosts to the clusters, delete hosts from the clusters and delete the clusters. The cluster management center 138 may further be configured to monitor the current configurations of the hosts 112 in the clusters and the VMs 124 running on the hosts. The monitored configurations may include hardware and/or software configurations of each of the hosts 112. The monitored configurations may also include VM hosting information, i.e., which VMs are hosted or running on which hosts. In order to manage the hosts 112 and the VMs 124 in the clusters, the cluster management center 138 support or execute various operations. In an embodiment, the cluster management center 138 is a computer program that resides and executes in a computer system, such as one of the hosts 112, or in one of the VMs 124 running on the hosts.

As illustrated, the cluster management center 138 includes the resource scheduler 134, which operates with the local schedulers 130 of the hosts 112 as part of the distributed resource management system to provide resource scheduling and load balancing solution for the SDDC 102. Thus, the resource scheduler 134 can be viewed as a resource manager. The resource scheduler 134 is configured to work on a cluster of hosts and to provide resource management capabilities, such as load balancing and placement for software components, such as VMs. The resource scheduler 134 is also configured to enforce user-defined resource allocation policies at the cluster level, while working with system-level constraints. Thus, the resource scheduler 132 controls the operations for initial placements of VMs, e.g., in the hosts 112, and subsequent VM migrations in the SDDC, e.g., between the hosts 112, using various placement rules for the VMs. These placement rules used by the resource scheduler to perform these placement operations are referred to herein as resource scheduler (RS) placement rules.

In addition, the resource scheduler 134 facilitates automatic scale out and scale in each of the clusters 110 of hosts to provide an elastic capability feature. A scale-out operation on a cluster is an operation to add resources to the cluster when one or more resource utilizations, e.g., CPU, memory and storage, exceeds scale-out resource utilization thresholds. In an embodiment, a cluster is scaled out when any of the resource utilizations consistently remain above the scale-out resource utilization thresholds. A scale-in operation on a cluster is an operation to remove or release resources from the cluster when all resource utilizations, e.g., CPU, memory and storage, fall below their scale-in resource utilization thresholds. In an embodiment, a cluster is scaled in when all the resource utilizations are consistently below the scale-in resource utilization thresholds. In an embodiment, the resources that are being removed for scale-in operations and added for scale-out operations are host computers. However, in other embodiments, these resources may be other type of physical resources, such as storage devices, or virtual resources, such as virtual compute, memory and/or storage resources. The resource scheduler 134 may provide many tools for users to customize the scale-out and scale-in operations by allowing the users to adjust any of the scale-out and scale-in resource utilization thresholds.

In an embodiment, the cluster management center 138 is a computer program that resides and executes in a computer system, such as one of the hosts 112, or in one of the VMs 124 running on the hosts. In a particular implementation, the resource scheduler 134 is VMware vSphere® Distributed Resource Scheduler™ (DRS) module and the cluster management center 138 is VMware vCenter Server® software made available from VMware, Inc.

In an embodiment, at least some of the components of the SDDC 102, such as the logical network manager 132, the edge services gateway 136 and/or the cluster management center 138, may be implemented in one or more virtual computing instance, e.g., VMs 124, running in the SDDC. In some embodiments, there may be multiple instances of the logical network manager 132 and the edge services gateway 136 and the cluster management center 138 that are deployed in the SDDC 102.

As noted above, the SDDC analysis system 104 may be used to analyze the SDDC 102 so that users of the SDDC 102 can characterize and tune the workloads and policy parameters of the SDDC. This characterization and tunning may include scaling VM workloads, choosing different mathematical functions and algorithms, and testing different resource utilization thresholds. Careful consideration to resource utilization is essential when engaging in resource scaling, as it carries both cost and performance implications. It is important not to quickly react to short-term spikes or dips in resource usage. As described below, the approach used by the SDDC analysis system 104 requires gradual optimization of resource utilization, factoring in utilization trends over a specific timeframe before determining any scaling actions. By basing decisions on smoothed utilization patterns over time, one can achieve consistent cluster performance. To achieve this smoothing effect, a range of industry-standard algorithms are available. Selecting the most suitable algorithm for a customer's cluster workload involves a process of experimentation, which is facilitated by the framework of the SDDC analysis system. Among the commonly employed algorithms (industry standard) are moving averages, exponential moving averages, Holt Linear, etc. Each algorithm exerts a distinct influence on streaming data. The SDDC analysis system empowers users to choose from these techniques, allowing them to identify the one that best aligns with their workload requirements. Thus, the SDDC analysis system provides a framework that fosters experimentation and the selection of the most suitable algorithm as a pivotal facet of the scaling decision-making process.

As described below, the SDDC analysis system 104 processes historical resource usage data with modified parameters and provides a graphical visualization of the resource elasticity profile of an SDDC cluster, such as the cluster 110 in the SDDC 102. In each iteration, users are able to see how the resource elasticity profile of the cluster changes, and save the constructs that balance the cost and performance characteristics of the cluster. In an embodiment, a single click may transfer the profile from the analytic environment to the cluster.

Although the custom policy on the resource scheduler 134 allows users to manage the autoscaling behavior of their clusters, knowing the right set of values to tune, and analyzing the impact on production workloads, overall billing and cluster performance are challenging. The idea behind the SDDC analysis system 104 is to provide users the flexibility to play around with historical cluster data, introduce variation in their raw utilization data coupled with different combinations of resource thresholds. The utilization curve can also be smoothened. The weights assigned to historical utilization values and the current utilization value can also be customized and tuned to strike a good balance. Using the SDDC analysis system 104, users can iteratively tune parameters and analyze the resulting cost implications and performance until a fine balance is achieved.

Figure 2:
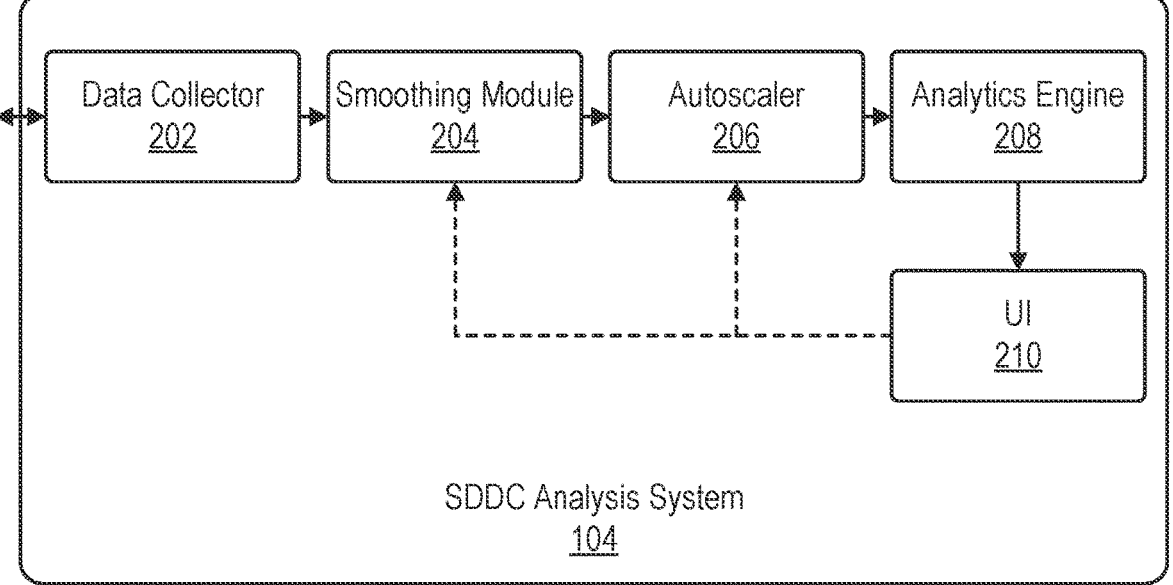
FIG. 2 shows components of a software-defined data center (SDDC) analysis system in the computing system in accordance with an embodiment of the invention.

Turning now to FIG. 2, components of the SDDC analysis system 104 in accordance with an embodiment of the invention are illustrated. As shown in FIG. 2, the SDDC analysis system 104 includes a data collector 202, a smoothing module 204, an autoscaler 206, an analytics engine 208 and a user interface 210. The SDDC analysis system 104 may reside in any computing environment, such as a private or public cloud. In an embodiment, the SDDC analysis system 104 may be implemented as a service that is running on a public cloud.

The data collector 202 of the SDDC analysis system 104 operates to periodically collect raw resource utilization metrics from the host cluster 110 in the SDDC 102. The resource utilization metrics that are collected will be compute (CPU), memory and storage utilization metrics from the hosts 112 of the cluster 110. These resource utilization metrics may be retrieved from the cluster management center 138 and/or from the hosts 112 of the cluster 110. In an embodiment, the resource utilization metrics may be collected at predefined regular intervals from the SDDC 102, for example, every few minutes or every few hours.

The smoothing module 204 of the SDDC analysis system 104 operates to smooth out spikes and randomness in the resource usage represented by the collected resource utilization metrics using various techniques. As an example, the smoothing techniques that may be used by the smoothing module 204 include an exponential method, a moving average method, a double exponential method and a spline curve fitting. One or more of these smoothing techniques may be used to cancel out the unwanted variations in the collected resource utilization metrics. In some scenarios, the resulting data may reveal interesting trends and patterns in the collected data.

The smoothing module 204 may use preset weights or custom weights to perform the smoothing operation. The option to use preset or custom weights and/or the option to use a particular type of smoothing technique may be user selectable.

The autoscaler 206 of the SDDC analysis system 104 operates to automatically determine virtual scaling operations based on the collected resource utilization data using various scale-in and scale-out resource thresholds. That is, the autoscaler determines either a scale-in operation, i.e., a removal of a host from the SDDC cluster under analysis, or a scale-out operation, i.e., an addition of a host to the SDDC cluster under analysis, based on the resource utilization in the SDDC cluster in view of the resource thresholds, which are user adjustable. These resource thresholds include thresholds for scale-in and scale-out determinations for each of the resources being considered. In an embodiment, the autoscaler 206 uses the same algorithm as the resource scheduler 134 to execute autoscaling operations in the SDDC 102.

The analytics engine 208 of the SDDC analysis system 104 operates to perform cost analysis, incident hour computation, and slack capacity calculation for a selected period of time for the SDDC cluster being analyzed using the autoscaling results of the autoscaler 206. Cost analysis is a calculation of the cost of the SDDC cluster for the selected period of time, which will vary depending on the number of hosts being used in the SDDC at different times and the cost of each host per unit of time. For example, the cost analysis may use the cost of host per hour, e.g., $8.36 for each host per hour. Thus, the cost computation will vary depending on the dynamic use of hosts in the SDDC cluster during a select period of time, which will depend on the results of the scale-in and scale-out operations made during the period.

Thus, based on the elastic policy set, the historical cluster configuration and resource utilization data, the cost incurred to the customer for a select period of time can be calculated. On each iteration of input parameter tuning (i.e., changing the operational parameters of the data collector 202, the smoothing module 204 and/or the autoscaler 206), the resulting cost implications may be calculated and presented to the user in terms of savings or additional expense. In an embodiment, the total cost incurred for a period of time is calculated using the following equation:

$$\text{Cost} = \sum_{j=1}^{M}(N_j \times \delta \times m)$$

where j is over every δ-minute interval, M is the total number of δ-minute intervals in the period of time being considered, $N_j$ is the number of hosts in cluster at jth interval and m is the cost per minute per host. As an example, δ may be 5 so that 5-minute intervals are being considered.

Incident hours define the duration for which a workload will operate under resource constrained or degraded conditions. In a computing environment, workload resource demands are dynamically changing. Elasticity responds to varying demands and scales the resource. However, there are scenarios where the response time of elasticity can be suboptimal, leading to temporary degradation in workload performance. This delay can occur because elasticity either responds slowly, responds too quickly, or reacts too late to the changing demands. Since customers have the flexibility to set different elasticity thresholds for CPU, memory and storage, it becomes crucial for them to understand the potential impact on their workloads due to the suboptimal response time of elasticity.

Thus, armed with the information regarding the incident hours, customers can make informed decisions when setting elasticity thresholds, aiming to minimize the total incident hours (i.e., the time duration where the cluster struggles to meet workload demands). Incident hours may be calculated by adding a predefined time, e.g., $1/12$th of an hour or 5 minutes, when any of the resource utilization percentages breaches a desirable performance threshold, which may be set by a customer or user. For example, if the desirable performance threshold is set at 80% for memory but memory utilization percentage is at 85%, the total duration during which the desirable performance threshold is breached adds up to incident hours. In an embodiment, the incident hours for a SDDC cluster may be calculated using the following algorithm.

---

Algorithm 1: Algorithm to compute incident hours

---

Input : DataPoints ← List(tuple[memUtilPct, cpuUtilPct, storageUtilPct]), desirablePerformanceThreshold
1. // Initialization
2. IncidentHours=0
3. /* Incident hours go up by 1/12th of an hour on breaching desirablePerformanceThreshold.                              */
4. for each entry in Datapoints do
5.     if memUtilPct >= desirablePerformanceThreshold || cpuUtilPct >= desirablePerformanceThreshold || storageUtilPct >= desirablePerformanceThreshold then
6.         IncidentHours = IncidentHours + (5/60)
7.     else
8. end for
9. return IncidentHours

---

Slack capacity is a measure of unutilized resource capacity in a cluster during a given period of time. Higher slack capacity denotes a possibility of over provisioning of resources and a lower slack capacity signifies a likelihood of resource crunch (i.e., running out of resources). Slack capacity may be calculated by subtracting the maximum utilization percentage for any of the resources being analyzed from 100 percent for each data point and then averaging these resulting values for all the data points. In an embodiment, on each iteration of input parameter tuning, the slack capacity for a SDDC cluster may be calculated using the following algorithm.

---

Algorithm 2: Algorithm to compute Slack Capacity

---

10. Input : DataPoints ← List(tuple[memUtilPct, cpuUtilPct, storageUtilPct])
11. Init : SumUnutilizedCapacty ← 0
12. for entry in DataPoints do
13. i ← entry[0]
14. j ← entry[0]
15. k ← entry[0]
16. minimumUnutilizedCapacity ← 100 − max(i, j, k)
17. SumUtilizedCapacity + = minimumUnutilizedCapacity
18. end for
19. SlackCapacity = SumUtilizedCapacity / len(DataPoints)

---

The UI 210 of the SDDC analysis system 104 allows users to enter parameters to adjust the operations performed by the data collector 202, the smoothing module 204, the autoscaler 206 and the analytics engine 208. As an example, for the data collector 202, the frequency of the data collection and the time window for analysis can be adjusted using the UI 210 so that the collected utilization data for all resources for the selected time window is used for the analysis. For the smoothing module 204, the weights that are used for smoothing and/or the smoothing method used may be adjusted using the UI 210. For the autoscaler 206, the threshold settings for CPU, memory and/or storage (i.e., the scale-in and scale-out resource thresholds) may be adjusted using the UI 210. For the analytics engine 208, the duration of the analysis and the resources being used for the analysis may be adjusted using the UI 210. In addition, the option to compute the cost, the incident hours and/or the slack capacity by the analytics engine 208 may be adjusted using the UI 210.

The UI 210 also presents results of the analysis performed by analytics engine 208 to be consumed by users. The analysis results may include the cost analysis, the computed incident hours, and the slack capacity for each iteration. The analysis results may also include a graph showing the resource capacity over a period of time and the scale-in and scale-out events during the time period. An example of analysis results 300 for a particular iteration in accordance with an embodiment of the invention is illustrated in FIG. 3.

Figure 3:
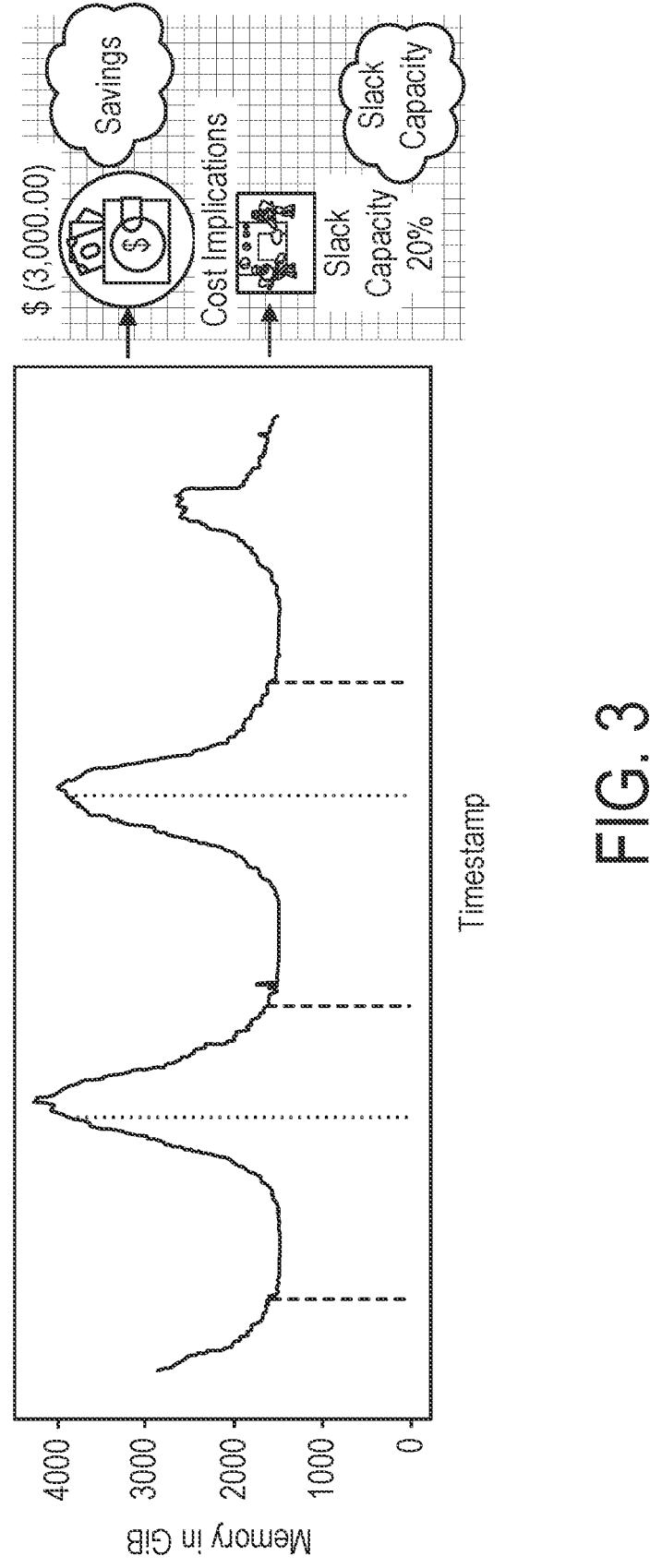
FIG. 3 shows an example of analysis results of the SDDC analysis system for a particular iteration in accordance with an embodiment of the invention.

As shown in FIG. 3, the analysis results 300 show the resource capacity over a period of time. The analysis results also show three scale-in operations and two scale-out operations that were executed during this period. The analysis results also show the cost analysis savings of $3,000 and a slack capacity of 20%.

Using the analysis results, such as the analysis results 300 depicted in FIG. 3, for different configurations with respect to parameters for autoscaling operations, a user can select the optimal configuration based on cost analysis, the computed incident hours, and/or slack capacity. Thus, the SDDC analysis system 104 can be used to select the optimal resource scaling policy parameters for an SDDC cluster to reduce cost, while maintaining comfortable slack capacity.

In an embodiment, the SDDC analysis system 104 allows a user to transfer parameters used in the analysis to the SDDC cluster being analyzed using the UI 210, which may provide a button for a single click transfer of the parameters. Thus, the SDDC analysis system 104 provides a simple mechanism to change the parameters of the resource scheduler 134 to implement the input parameters used in one of the analyses that offers the desired cost, the incident hours, and/or slack capacity. Further, the SDDC analysis system 104 can be modeled and made more intuitive with artificial intelligence (AI) or machine learning (ML) solutions, allowing users to reap the benefits of higher cost savings.

The benefits of the SDDC analysis system 104 are further described using an example of an SDDC running in VMware Cloud™ on AWS. In this example, only a single cluster of hosts will be considered. However, the SDDC analysis system 104 may be used for SDDCs with multiple clusters of hosts. Resource utilization metrics used for this example include capacity, demand and exponentially weighted moving average (EWMA) values that are collected every five minutes over a period of thirty (30) days, which amounts to around 8600 data points. Only the raw utilization data is considered for this example without any variations except for resource thresholds for scale-out and scale-in operations across iterations.

In this example, a memory intensive workload is considered on the cluster where scale-out occurs due to high memory utilization and scale-in occurs when memory, CPU and storage utilization on the cluster are all below specific thresholds set based on the resource autoscaling policy. The analysis starts with five (5) hosts in the cluster and the corresponding resource capacities for AWS EC2 i3en.metal instance type. The scaling operations are observed based on policy thresholds and data over various 5-minute intervals. A scale-out event is accounted for when the memory utilization breaches 80% of the total memory capacity available. The resource capacities are then readjusted, the host count in the cluster is incremented, and the cost incurred to the customer is computed. Similarly, a scale-in event is accounted for when CPU, memory and storage utilizations are within 60%, 60% and 20% of their respective capacities. The resource capacities are then readjusted, the host count in the cluster is decreased, and the cost saved for the customer is computed.

For this example, a base iteration is initially performed by the analytics engine 208 with memory scale-out threshold set to 80%, memory scale-in threshold set to 60%, CPU scale-in threshold set to 60% and storage scale-in threshold set to 20%. Then, a first iteration is performed by the analytics engine 208 with memory scale-out threshold set to 80%, memory scale-in threshold set to 30%, CPU scale-in threshold set to 30% and storage scale-in threshold set to 20%. A second iteration is performed by the analytics engine 208 with memory scale-out threshold set to 95%, memory scale-in threshold set to 65%, CPU scale-in threshold set to 65% and storage scale-in threshold set to 20%. The results of these iterations are shown in the following table.

Figure 4A:
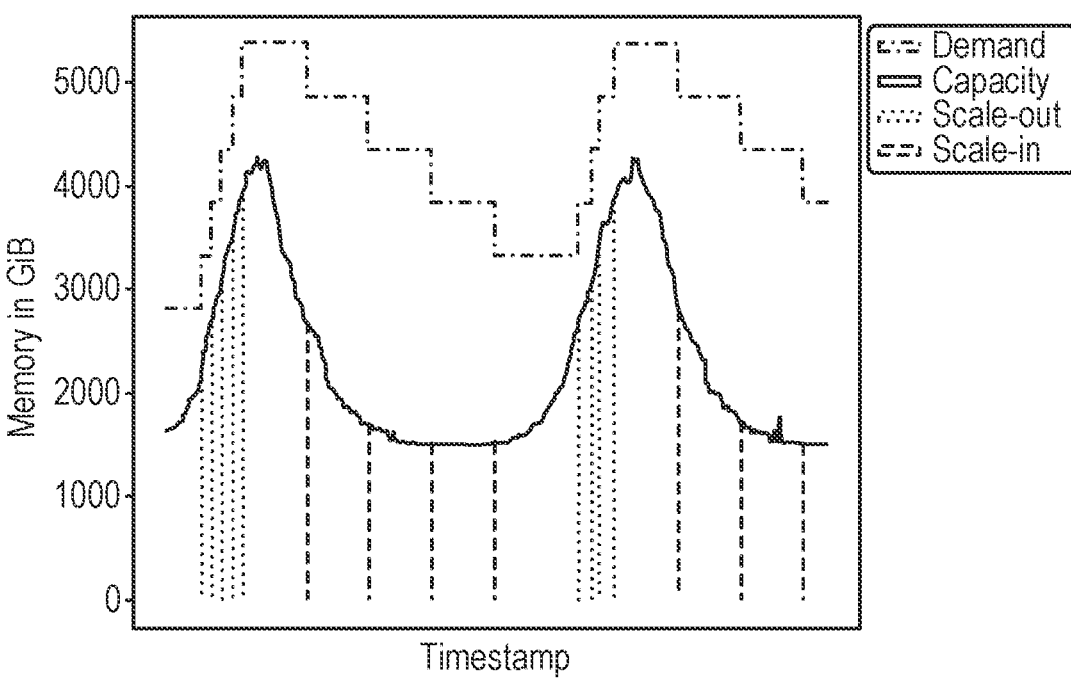
FIG. 4A illustrates a small section of observed data for a base iteration, which shows the memory demand, the memory capacity, the scale-out and scale-in events, in accordance with an embodiment of the invention.

A small section of the observed data for the base iteration is illustrated in FIG. 4A, which shows the memory demand, the memory capacity, the scale-out operations and the scale-in operations.

Figure 4B:
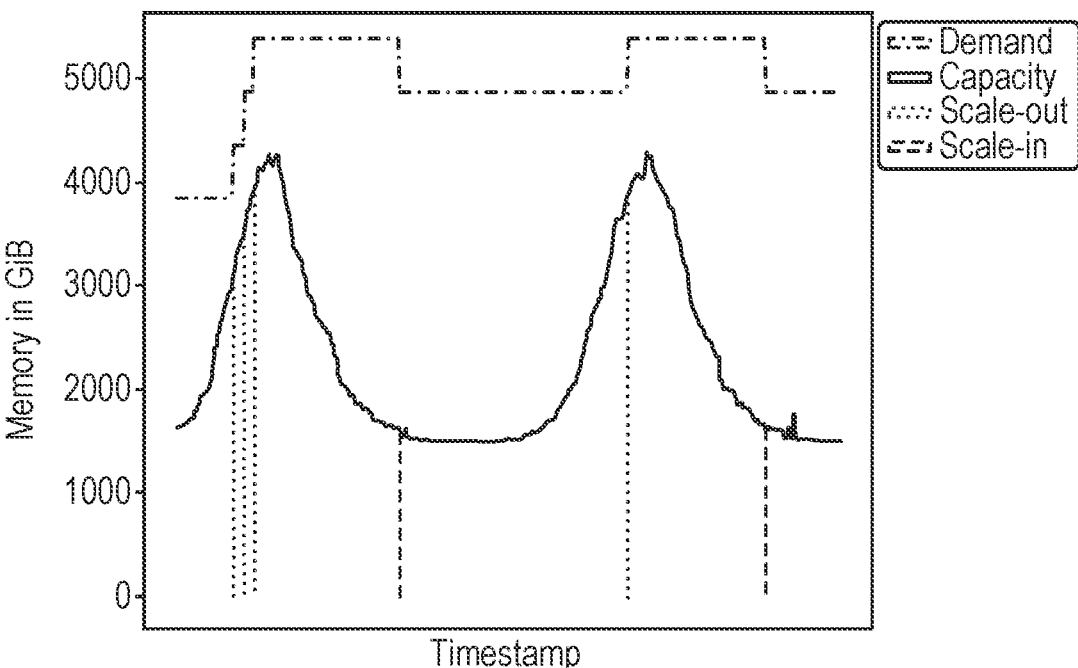
FIG. 4B illustrates a small section of observed data for an iteration, which shows the memory demand, the memory capacity, the scale-out and scale-in events, in accordance with an embodiment of the invention.
Figure 4C:
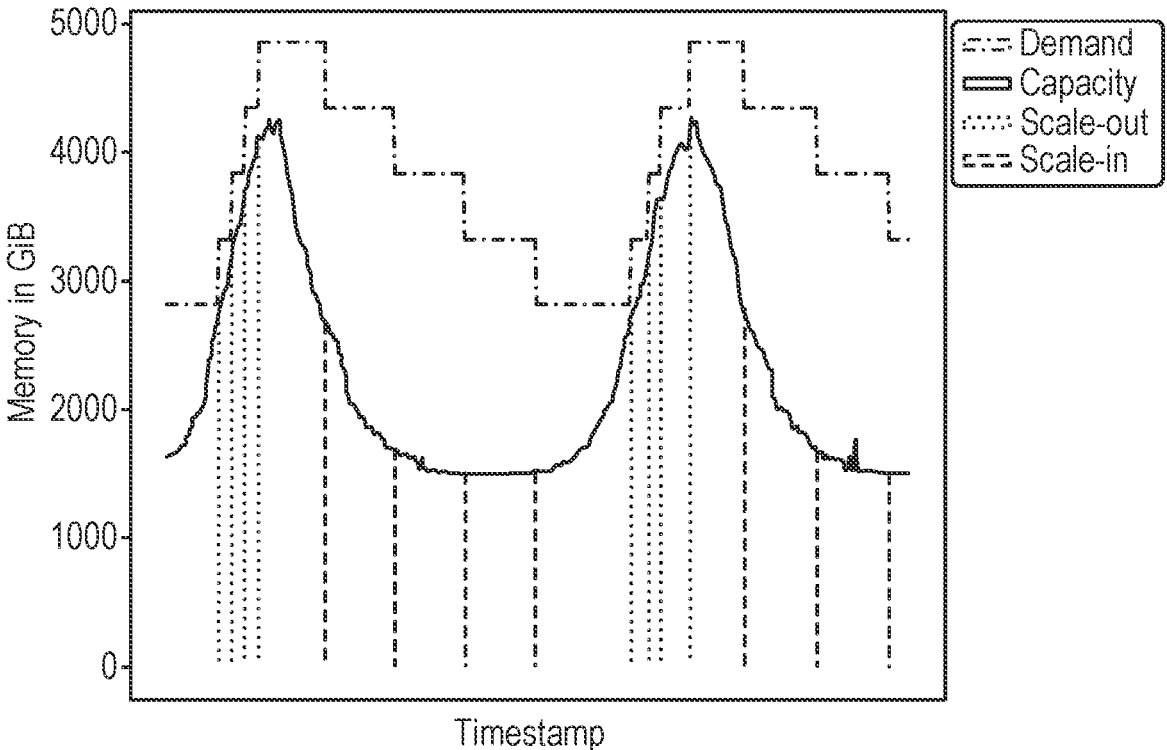
FIG. 4C illustrates a small section of observed data for another iteration, which shows the memory demand, the memory capacity, the scale-out and scale-in events, in accordance with an embodiment of the invention.

For the iteration 1, there were 17 scale-outs and 12 scale-ins for the observation period. Since the number of scale-in operations is on the lower end, there is a higher number of hosts left behind in the cluster at the end of the observation period. Thus, the cost for the customer has increased by $10,491. The slack capacity has also increased to 59.87%. A small section of the observed data for the iteration 1, which corresponds to the section shown in FIG. 4A for the base iteration, is illustrated in FIG. 4B, which shows the memory demand, the memory capacity, the scale-out operations and the scale-in operations.

For the iteration 2, the number of scale-out and scale-in operations have dropped to 32 and 30, respectively, from the previously seen values of 49 and 47 for the base iteration. Thus, there is a cost savings of $2495 and a significant drop in slack capacity to 47.28%.

By iteratively adjusting the memory scale-out, memory scale-in, CPU scale-out, CPU scale-in, storage scale-out and/or storage scale-in thresholds and running the analytics engine 208, the customer can select the optimal setting for an SDDC with respect to cost and slack capacity.

Another example illustrating the benefits of the SDDC analysis system 104 is now described. In this example, a rapid scale-up policy (i.e., multiple hosts for scale-outs) is enabled on the SDDC. Resource utilization metrics used for this example include capacity, demand and exponentially weighted moving average (EWMA) values that are collected every five minutes over a period of one (1) day. In different iterations, scale-up increments and resource thresholds have been modified. This policy is suitable for virtual desktop infrastructure (VDI) workloads where hosts are added in bulk expecting a huge demand at a point of time, and similarly scaling down the cluster one at a time when the demand goes down. On any resource breach, a scale-out operation is performed to add a number of hosts in parallel equivalent to the scale-up increment set in the policy. However, the scale-in operation is performed one at a time based on the recommendation from the platform. This example considers the time taken to add a host as around twenty (20) minutes, and the results reflect an increase in capacities when the hosts are successfully added. Similarly, a decrease in capacity is noticed on each subsequent scale-in performed. Based on the thresholds in each iteration, add host or remove host operations are performed adhering to the cool off periods between successive events to not act on

| Iteration ("Iter") | Memory scale-out threshold (%) | Memory scale-in threshold (%) | CPU scale-in threshold (%) | Storage scale-in threshold (%) | No of scale-outs | No of scale-ins | Cost ($) | Change in Cost ($) | Slack Capacity |
|---|---|---|---|---|---|---|---|---|---|
| Base Iter. | 80 | 60 | 60 | 20 | 49 | 47 | 44,526 | N/A | 50.27% |
| Iter. 1 | 80 | 30 | 30 | 20 | 17 | 12 | 55,017 | +10491 | 59.87% |
| Iter. 2 | 95 | 65 | 65 | 20 | 32 | 30 | 42,031 | −2495 | 47.28% |

For the base iteration, there were 49 scale-outs (assuming that the CPU and storage utilization on the cluster are well within their scale-out thresholds) and 47 scale-ins. At a rate of $8.36 per hour as the on-demand rate per host, the cost for the customer is calculated to be around $44526 over a period of 30 days and the slack capacity is calculated to be 50.27%.

spikes or randomness in utilization. The results of these iterations are shown in the following tables. The first table shows the different thresholds and the number of scale-up increments. The second table shows the cost, cost savings, savings percentage and incident hours for the different iterations.

| Iteration ("Iter") | Memory scale-out threshold (%) | Memory scale-in threshold (%) | CPU scale-out threshold (%) | CPU scale-in threshold (%) | Storage scale-out threshold (%) | Storage scale-in threshold (%) | No of Scale-outs |
|---|---|---|---|---|---|---|---|
| Base Iter. | 80 | 50 | 80 | 50 | 80 | 40 | 3 |
| Iter. 1 | 60 | 45 | 60 | 45 | 80 | 40 | 3 |
| Iter. 2 | 80 | 50 | 80 | 50 | 80 | 40 | 2 |
| Iter. 3 | 60 | 45 | 60 | 45 | 80 | 40 | 4 |
| Iter. 4 | 80 | 50 | 80 | 50 | 80 | 40 | 4 |
| Iter. 5 | 60 | 45 | 60 | 45 | 80 | 40 | 2 |

| Iteration ("Iter") | Cost ($) | Cost Savings ($) | Savings in Percentage (%) | Incident Hours |
|---|---|---|---|---|
| Base Iter. | 1106 | N/A | N/A | 0.583 |
| Iter. 1 | 1195 | −89 | −8.05 | 0 |
| Iter. 2 | 850 | 256 | 23.15 | 22.5 |
| Iter. 3 | 1327 | −221 | −19.18 | 0 |
| Iter. 4 | 1021 | 85 | 7.69 | 0.083 |
| Iter. 5 | 1018 | 88 | 7.96 | 1.416 |

As shown in the above tables, the results of iteration 2 shows cost savings of 23.15% as two hosts are added during a scale-out operation compared to the base iteration where the scale-up increment is three hosts. However, the incident hours are as high as 22.5 hours of possible downtime in the performance, which is not a desirable outcome. In iteration 1, with 60% as the scale-out threshold and 45% as the scale-in threshold for memory and CPU, and three (3) hosts as the scale-up increment, a spike is seen in the cost by nearly 8% with the least downtime, whereas the scale-up increment being two (2) in similar configurations (i.e., iteration 5) shows cost savings of 7% with 1.4 hours of possible downtime. These iterations provide customer with insightful data to make decisions and weigh the trade-offs best suiting workload demands.

A process of analyzing an SDDC cluster, e.g., the host cluster 110 of the SDDC 102, by the SDDC analysis system 104 in accordance with an embodiment of the invention is described with reference to a process flow diagram of FIG. 5. The process begins at step 502, where raw resource utilization metrics of the SDDC cluster are collected by the data collector of the SDDC analysis system at regular intervals, such as 5 minute intervals. The raw resource utilization metrics may include CPU, memory and/or storage usage data. In an embodiment, the collection of raw resource utilization metrics may be initiated by a user of the SDDC, e.g., an administrator, using the UI 210 of the SDDC analysis system 104. In some embodiments, other resource metrics may be collected along with the raw resource utilization metrics, such as resource demands.

Next, at step 504, a user request to run an analysis on the SDDC cluster is received by the SDDC analysis system 104. The user request may be entered using the UI 210 of the SDDC analysis system 104. The user request may include settings for the data collector 202, the smoothing module 204, the autoscaler 206 and/or the analytics engine 208. As described above, the settings for the data collector 202 may be a selection of VM workloads, host statistics data, VM-host policies, and resource utilizations. The settings for the smoothing module 204 may be a selection of weights to be used for smoothing the collected raw resource utilization metrics and/or the type of technique to be used for smoothing. The settings for the autoscaler 206 may include any changes to the resource thresholds for scale-in and scale-out determinations. The settings for the analytics engine 208 may include the options to compute cost, incident hours and/or slack capacity, and the selection of a period of time for the computations. Thus, the user can select to compute any of the cost, the incident hours, and the slack capacity, as well as the period of time to compute the cost, the incident hours and/or the slack capacity.

Next, at step 506, in response to the user request, the collected raw resource utilization metrics are smoothed by the smoothing module 204 of the SDDC analysis system 104 using the settings for the smoothing module defined in the user request.

Next, at step 508, in response to the user request, scale-in and scale-out operations during the period of time defined in the user request are determined by the autoscaler 206 of the SDDC analysis system 104 using the resource thresholds defined in the user request.

Next, at step 510, in response to the user request, cost, incident hours and/or slack capacity for the period of time are computed by the analytics engine 208 of the SDDC analysis system 104 using resource information of the SDDC cluster during the period of time, including the scale-in and scale-out information, the resource utilizations, the number of hosts being used and cost for each host per unit of time.

Next, at step 512, in response to the user request, the cost, the incident hours and/or the slack capacity of the SDDC cluster for the period of time are displayed on the UI 210 for user consumption. In some embodiments, a graph showing various information about the selected period of time may be displayed along with the cost, the incident hours, and/or the slack capacity. The graph may include resource (e.g., CPU, memory and/or storage) demands, resource usages, resource capacities, scale-in events and scale-out events.

Next, at optional step 514, in response to user input to use the thresholds of the current analysis, the settings of the resource scheduler 134 in the SDDC are set to the thresholds of the current analysis by the SDDC analysis system 104.

The process may proceed back to step 504 if the user enters another request to run an analysis using different resource thresholds for the analysis. Thus, the user can find the optimal resource thresholds to use on the SDDC cluster in view of cost and/or slack capacity by adjusting the resource thresholds for different analysis iterations.

Figure 6:
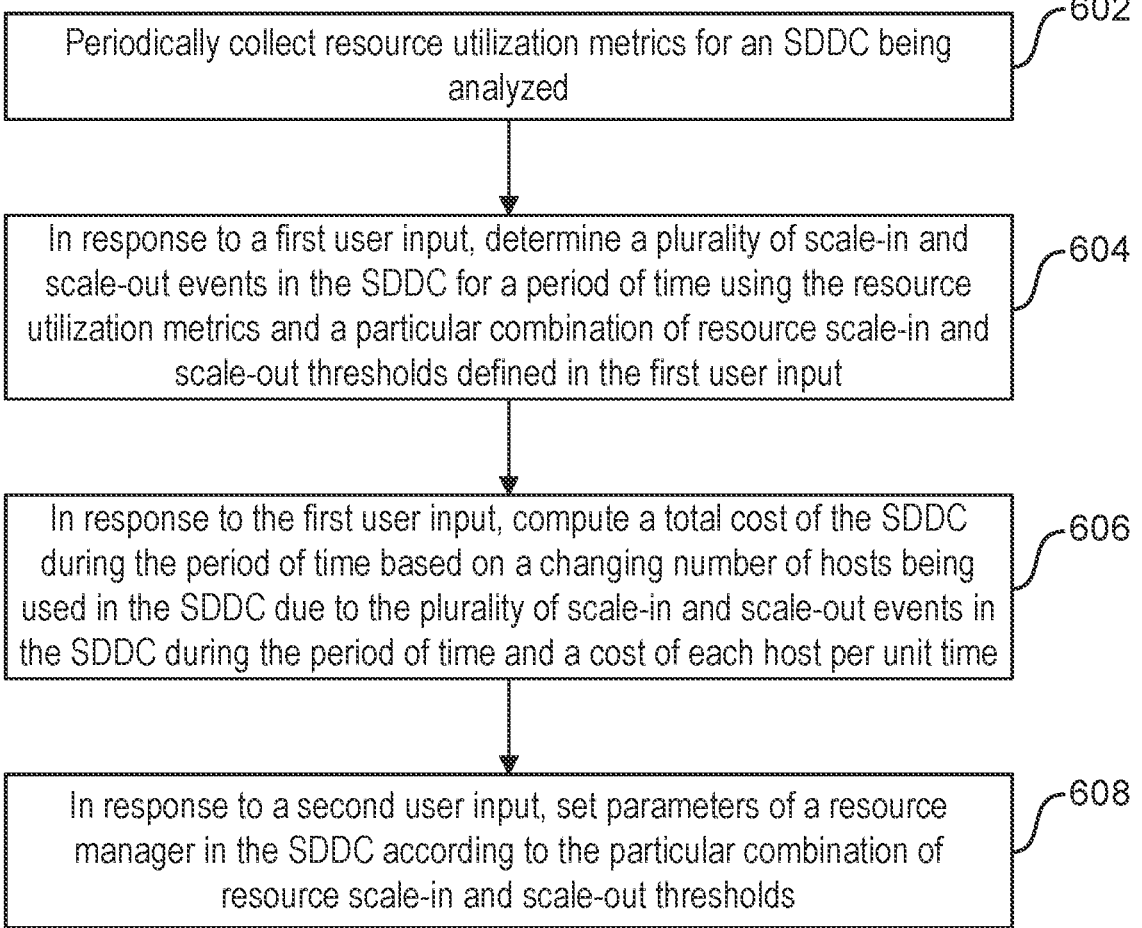
FIG. 6 is a flow diagram of a computer-implemented method for analyzing software-defined data centers (SDDCs) in accordance with an embodiment of the invention.

A computer-implemented method for analyzing software-defined data centers (SDDCs) in accordance with an embodiment of the invention is described with reference to a flow diagram of FIG. 6. At block 602, resource utilization metrics for an SDDC being analyzed are periodically collected. At block 604, in response to a first user input, a plurality of scale-in and scale-out events in the SDDC for a period of time is determined using the resource utilization metrics and a particular combination of resource scale-in and scale-out thresholds defined in the first user input. At block 606, in response to the first user input, a total cost of the SDDC during the period of time is computed based on a changing number of hosts being used in the SDDC due to the plurality of scale-in and scale-out events in the SDDC during the period of time and a cost of each host per unit time. At block 608, in response to a second user input, parameters of a resource manager in the SDDC are set according to the particular combination of resource scale-in and scale-out thresholds.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for analyzing software-defined data centers (SDDCs), the method comprising:
   periodically collecting resource utilization metrics for an SDDC being analyzed;
   in response to a first user input, determining a plurality of scale-in and scale-out events in the SDDC for a period of time using the resource utilization metrics and a particular combination of resource scale-in and scale-out thresholds defined in the first user input;
   in response to the first user input, computing a total cost of the SDDC during the period of time based on a changing number of hosts being used in the SDDC due to the plurality of scale-in and scale-out events in the SDDC during the period of time and a cost of each host per unit time; and
   in response to a second user input, setting parameters of a resource manager in the SDDC according to the particular combination of resource scale-in and scale-out thresholds.

2. The computer-implemented method of claim 1, further comprising:
   in response to another user input, determining a second plurality of scale-in and scale-out events in the SDDC for the period of time using the resource utilization metrics and a different combination of resource scale-in and scale-out thresholds defined in the another user input; and
   in response to the another user input, computing another total cost of the SDDC during the period of time based on another changing number of hosts being used in the SDDC due to the second plurality of scale-in and scale-out events in the SDDC during the period of time and the cost per host per unit time.

3. The computer-implemented method of claim 1, further comprising, in response to the first user input, computing a slack capacity of at least one resource in the SDDC during the period of time, wherein the slack capacity is a measure of unutilized capacity of the at least one resource in the SDDC during the period of time.

4. The computer-implemented method of claim 3, wherein the slack capacity is computed by subtracting a maximum utilization percentage for the at least one resource from 100 percent for each data point and then averaging resulting values for all data points.

5. The computer-implemented method of claim 1, wherein computing the total cost of the SDDC during the period of time includes summing products of a number of host, a time interval and a cost per host per the time interval for data points in the period of time.

6. The computer-implemented method of claim 1, further comprising, in response to the first user input, computing incident hours for the SDDC during the period of time, wherein the incident hours define a duration for which a workload operates under resource constrained conditions in the SDDC during the period of time.

7. The computer-implemented method of claim 1, wherein the resource scale-in and scale-out thresholds include scale-in and scale-out thresholds for compute, memory or storage.

8. The computer-implemented method of claim 1, further comprising displaying a capacity for at least one resource in the SDDC for the period of time, the scale-in and scale-out events in the SDDC during the period of time and the computed cost in a user interface.

9. The computer-implemented method of claim 1, further comprising, in response to the first user input, executing a smoothing technique on the resource utilization metrics using one or more parameters defined in the first user input, wherein the parameters include a type of smoothing technique and weights for the smoothing technique.

10. A non-transitory computer-readable storage medium containing program instructions for analyzing software-defined data centers (SDDCs), wherein execution of the program instructions by one or more processors of a computer causes the one or more processors to perform steps comprising:

periodically collecting resource utilization metrics for an SDDC being analyzed;

in response to a first user input, determining a plurality of scale-in and scale-out events in the SDDC for a period of time using the resource utilization metrics and a particular combination of resource scale-in and scale-out thresholds defined in the first user input;

in response to the first user input, computing a total cost of the SDDC during the period of time based on a changing number of hosts being used in the SDDC due to the plurality of scale-in and scale-out events in the SDDC during the period of time and a cost of each host per unit time; and in response to a second user input, setting parameters of a resource manager in the SDDC according to the particular combination of resource scale-in and scale-out thresholds.

11. The non-transitory computer-readable storage medium of claim 10, wherein the steps further comprise:

in response to another user input, determining a second plurality of scale-in and scale-out events in the SDDC for the period of time using the resource utilization metrics and a different combination of resource scale-in and scale-out thresholds defined in the another user input; and in response to the another user input, computing another total cost of the SDDC during the period of time based on another changing number of hosts being used in the SDDC due to the second plurality of scale-in and scale-out events in the SDDC during the period of time and the cost per host per unit time.

12. The non-transitory computer-readable storage medium of claim 10, wherein the steps further comprise, in response to the first user input, computing a slack capacity of at least one resource in the SDDC during the period of time, wherein the slack capacity is a measure of unutilized capacity of the at least one resource in the SDDC during the period of time.

13. The non-transitory computer-readable storage medium of claim 12, wherein the slack capacity is computed by subtracting a maximum utilization percentage for the at least one resource from 100 percent for each data point and then averaging resulting values for all data points.

14. The non-transitory computer-readable storage medium of claim 10, wherein computing the total cost of the SDDC during the period of time includes summing products of a number of host, a time interval and a cost per host per the time interval for data points in the period of time.

15. The non-transitory computer-readable storage medium of claim 10, wherein the steps further comprise, in response to the first user input, computing incident hours for the SDDC during the period of time, wherein the incident hours define a duration for which a workload operates under resource constrained conditions in the SDDC during the period of time.

16. The non-transitory computer-readable storage medium of claim 10, wherein the steps further comprise displaying a capacity for at least one resource in the SDDC for the period of time, the scale-in and scale-out events in the SDDC during the period of time and the computed cost in a user interface.

17. The non-transitory computer-readable storage medium of claim 10, wherein the steps further comprise, in response to the first user input, executing a smoothing technique on the resource utilization metrics using one or more parameters defined in the first user input, wherein the parameters include a type of smoothing technique and weights for the smoothing technique.

18. A system comprising:

memory; and at least one processor configured to:

periodically collect resource utilization metrics for a software-defined data center (SDDC) being analyzed;

in response to a first user input, determine a plurality of scale-in and scale-out events in the SDDC for a period of time using the resource utilization metrics and a particular combination of resource scale-in and scale-out thresholds defined in the first user input;

in response to the first user input, compute a total cost of the SDDC during the period of time based on a changing number of hosts being used in the SDDC due to the plurality of scale-in and scale-out events in the SDDC during the period of time and a cost of each host per unit time; and in response to a second user input, set parameters of a resource manager in the SDDC according to the particular combination of resource scale-in and scale-out thresholds.

19. The system of claim 18, wherein the at least one processor is configured to:

in response to another user input, determine a second plurality of scale-in and scale-out events in the SDDC for the period of time using the resource utilization metrics and a different combination of resource scale-in and scale-out thresholds defined in the another user input; and in response to the another user input, compute another total cost of the SDDC during the period of time based on another changing number of hosts being used in the SDDC due to the second plurality of scale-in and scale-out events in the SDDC during the period of time and the cost per host per unit time.

20. The system of claim 18, wherein the at least one processor is configured to, in response to the first user input, compute a slack capacity of at least one resource in the SDDC during the period of time, wherein the slack capacity is a measure of unutilized capacity of the at least one resource in the SDDC during the period of time.

* * * * *